US008910152B1

(12) United States Patent
Hyser et al.

(10) Patent No.: US 8,910,152 B1
(45) Date of Patent: Dec. 9, 2014

(54) MIGRATING A VIRTUAL MACHINE BY USING A HOT-PLUG EVENT

(75) Inventors: Chris D. Hyser, Victor, NY (US); Bret A. McKee, Fort Collins, CO (US); Robert D. Gardner, Fort Collins, CO (US); Brian J. Watson, Chesapeake, VA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1840 days.

(21) Appl. No.: 12/236,304

(22) Filed: Sep. 23, 2008

Related U.S. Application Data

(60) Provisional application No. 61/004,980, filed on Nov. 30, 2007.

(51) Int. Cl.
*G06F 9/455* (2006.01)

(52) U.S. Cl.
USPC ............................................................ 718/1

(58) Field of Classification Search
USPC .................................................... 718/1, 104
See application file for complete search history.

(56) References Cited

U.S. PATENT DOCUMENTS

| 7,203,944 | B1 * | 4/2007 | van Rietschote et al. ..... 718/104 |
| 7,383,405 | B2 * | 6/2008 | Vega et al. ..................... 711/162 |
| 7,761,612 | B2 * | 7/2010 | Corry et al. ........................ 710/8 |
| 7,788,665 | B2 * | 8/2010 | Oshins .............................. 718/1 |
| 7,814,495 | B1 * | 10/2010 | Lim et al. ...................... 718/104 |
| 8,001,543 | B2 * | 8/2011 | Wooldridge et al. ............. 718/1 |
| 2004/0107300 | A1 | 6/2004 | Padmanabhan et al. |
| 2004/0187106 | A1 | 9/2004 | Tanaka et al. |
| 2006/0206904 | A1 | 9/2006 | Watkins et al. |
| 2006/0224843 | A1 | 10/2006 | Rao et al. |
| 2007/0043860 | A1 | 2/2007 | Pabari |
| 2007/0050763 | A1 | 3/2007 | Kagan et al. |
| 2007/0156942 | A1 * | 7/2007 | Gough .......................... 710/302 |
| 2007/0180436 | A1 | 8/2007 | Travostino et al. |
| 2008/0104587 | A1 | 5/2008 | Magenheimer et al. |
| 2008/0104608 | A1 | 5/2008 | Hyser |
| 2008/0295094 | A1 * | 11/2008 | Korupolu et al. ................. 718/1 |
| 2009/0007099 | A1 * | 1/2009 | Cummings et al. ............... 718/1 |

OTHER PUBLICATIONS

Huang et al., Nomad: Migrating OS-bypass Networks in Virtual Machines, ACM, 2007, pp. 1-11.*
Hyser et al., Autonomic Virtual Machine Placement in the Data Center, HP, Feb. 26, 2008, pp. 1-11.*
Hyser et al., U.S. Appl. No. 11/588,607 entitled Migrating Virtual Machines Between Physical Machines in a Defined Group filed Oct. 27, 2006 (27 pages).
Hyser et al., U.S. Appl. No. 11/588,683 entitled Retrieving Data of a Virtual Machine based on Demand to Migrate the Virtual Machine between Physical Machines filed Oct. 27, 2006 (26 pages).
Hyser et al., U.S. Appl. No. 11/588,691 entitled Selecting One of Plural Layouts of Virtual Machines on Physical Machines filed Oct. 27, 2006 (29 pages).

* cited by examiner

*Primary Examiner* — Diem Cao

(57) ABSTRACT

To migrate a virtual machine from a first physical machine to a second physical machine, a hot-plug event notification is issued to an operating system of the virtual machine in response to an indication that the virtual machine is to be migrated. After issuing the hot-plug event notification, migration of the virtual machine to the second physical machine is performed.

15 Claims, 2 Drawing Sheets

MIGRATING A VIRTUAL MACHINE BY USING A HOT-PLUG EVENT

CROSS REFERENCE TO RELATED APPLICATIONS

This Application claims the benefit of U.S. Provisional Application Ser. No. 61/004,980, filed Nov. 30, 2007, titled "Migrating A Virtual Machine Using a Hot-plug Event"

BACKGROUND

Virtual machines can be provided in a computer to enhance flexibility and performance. A virtual machine typically refers to some arrangement of components (software and/or hardware) for virtualizing or emulating an actual computer, where the virtual machine can include an operating system and software applications. Virtual machines can allow different operating systems to be deployed on the same computer, such that applications written for different operating systems can be executed in different virtual machines (that contain corresponding operating systems) in the same computer. Moreover, the operating system of a virtual machine can be different from the host operating system that may be running on the computer on which the virtual machine is deployed.

In addition, a greater level of isolation is provided between or among applications running in different virtual machines. In some cases, virtual machines also allow multiple applications to more efficiently share common hardware resources (processing resources, input/output or I/O resources, and storage resources) of the computer. Such sharing of hardware resources is performed by virtualizing the hardware resources with an entity such as a hypervisor.

When a hypervisor virtualizes hardware resources, access requests by virtual machines for the hardware resources are handled through the hypervisor. However, an issue associated with virtualizing hardware resources is reduced performance associated with the overhead of performing virtualization of hardware resources. Such performance reduction may be unacceptable for certain applications. To address this, hypervisors allow some virtual machines to have direct input/output (I/O) control of hardware resources. However, an issue associated with providing direct I/O control of hardware resources is that virtual machines that have such direct I/O control cannot be efficiently live migrated from one physical machine to another physical machine without causing errors.

BRIEF DESCRIPTION OF THE DRAWINGS

Some embodiments of the invention are described, by way of example, with respect to the following figures.

DETAILED DESCRIPTION

Figure 1:
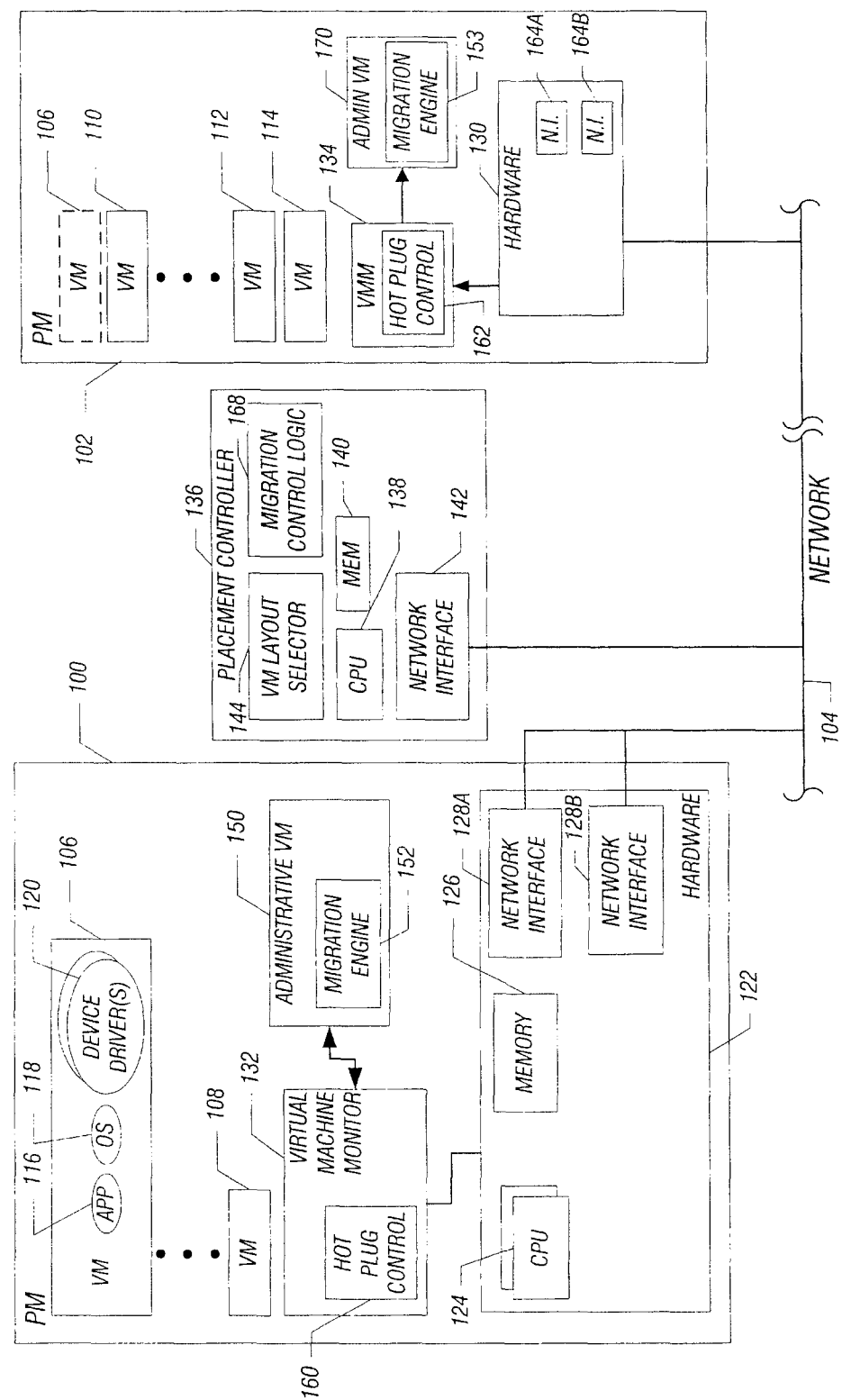
FIG. 1 is a block diagram of a system of physical machines on which virtual machines are deployed, in which migration of virtual machines between physical machines can be performed by using hot-plug events in accordance with an embodiment.

In accordance with some embodiments, a system includes plural physical machines containing virtual machines, with the system further including mechanisms that enable live migration of virtual machine(s) across physical machines. Virtual machine(s) can be efficiently migrated across physical machines even if the virtual machine(s) has (have) direct input/output (I/O) control of hardware resources in the physical machines. The migration of virtual machines that have direct I/O control of hardware resources is enabled by using hot-plug events during the migration procedure. Migration of a virtual machine refers to the movement of the virtual machine from one physical machine to another physical machine. "Live migration" refers to migration of the virtual machine while the physical machines are operational.

A "physical machine" refers to a machine that is an actual machine made up of software and hardware. A virtual machine refers to some partition or segment (made of up software and/or hardware) of the physical machine that is provided to virtualize or emulate a physical machine. From the perspective of a user, a virtual machine looks just like a physical machine. A physical machine can include multiple virtual machines. In some implementations, a first subset (one or more) of the virtual machines have direct I/O control of hardware resources within a physical machine, while a second subset (one or more) of virtual machines use virtualized I/O to access hardware resources. A virtual machine that has direct I/O control of a hardware resource is referred to as a "direct I/O virtual machine." Direct I/O control of a hardware resource refers to the ability of a virtual machine to access and/or control ports and address spaces of a hardware resource directly. Direct I/O control provides for enhanced performance of direct I/O virtual machines. However, conventionally, efficient migration of direct I/O virtual machines has not been provided. In accordance with some embodiments, hot-plug events are used to enable migration of direct I/O virtual machines from one physical machine to another physical machine.

A "hot-plug event" refers to an event that is generated when a hardware resource is hot added or hot removed from a system. "Hot adding" a hardware resource into a system refers to insertion of the hardware resource into a slot or port of the system while the system remains live and operational. "Hot remove" refers to removing an existing hardware resource from a slot or port of a system while the system remains live and operational. However, as described further below, the hot-plug events generated to enable migration of virtual machines are not in response to actual addition or removal of the corresponding hardware resource, but rather, in response to a request for migration of a direct I/O virtual machine. It is noted that not all hardware resources can be hot-plugged, though many hardware resources can be hot-plugged, such as many hardware resources that are performance critical (hardware resources that have an impact in achieving high performance of the system).

Note also that for certain hardware resources that provide multiple paths or connections (e.g., network interface circuits, storage area network interface circuits, etc.), one of the paths/connections can have direct I/O control, while another of the paths/connections can have virtualized I/O control.

FIG. 1 illustrates a system that includes multiple physical machines 100, 102 that are interconnected by a network 104. Examples of the network 104 include a local area network (LAN), a wide area network (WAN), the Internet, or any other type of communications link. The physical machines can be located within one cabinet (or rack), or alternatively, the physical machines can be located in multiple cabinets (or racks). The network 104 can also include system buses or other fast interconnects. Although reference is made to "network" in the discussion, it is noted that some embodiments can be used with other types of interconnects.

The system depicted in FIG. 1 can be any one of an application server farm, a storage server farm (or storage area network), a web server farm, a switch or router farm, and so forth. Although just two physical machines are depicted in FIG. 1, it is noted that more than two physical machines can be utilized in other implementations. Examples of the physical machines include computers (e.g., application servers, storage servers, web servers, etc.), communications modules (e.g., switches, routers, etc.), and other types of machines. Although each of the physical machines is depicted as being contained within a box, it is noted that a physical machine can be a distributed machine having multiple nodes that provide a distributed and parallel processing system.

Within each of the physical machines are various virtual machines (VMs). In the example of FIG. 1, two virtual machines 106, 108 are depicted in the physical machine 100, and three virtual machines 110, 112, 114 are depicted in the physical machine 102. Note that the numbers of virtual machines in each physical machine shown in FIG. 1 are provided for purposes of example, as different implementations can employ different numbers (one or more) of virtual machines in the corresponding physical machines.

As depicted in FIG. 1, according to an example implementation, the virtual machine 106 includes one or more software applications 116, an operating system 118, and one or more device drivers 120 (which are typically part of the operating system 118). The other virtual machines 108, 110, 112, 114 can also contain software applications, operating systems, and device drivers.

It is noted that the operating systems that are part of corresponding virtual machines within a physical machine can be different types of operating systems or different versions of an operating system. This allows software applications designed for different operating systems to execute on the same physical machine.

Certain virtual machines within a physical machine are designed to share the physical resources of the physical machine. In the physical machine 100, these physical resources include the hardware resources 122, which include one or more central processing units (CPUs) 124, memory (volatile memory and/or persistent storage, such as disk-based storage) 126, a first network interface 128A, and other resources (such as a storage area network interface, not shown).

To manage sharing by virtual machines of the hardware resources 122 of the physical machine 100, a virtual machine monitor (VMM) 132 is provided. The VMM 132 virtualizes some of the hardware resources 122. Also, the VMM 132 intercepts request for resources from operating systems in the respective virtual machines so that proper allocation of the physical resources of the physical machine 100 can be performed. For example, the VMM 132 manages memory access, I/O device access, and CPU scheduling for the virtual machines. Effectively, the VMM 132 provides an interface between the operating system of a virtual machine and the underlying hardware resources 122 of the physical machine 100. The interface provided by the VMM 132 to an operating system of a virtual machine is designed to emulate the interface provided by the actual hardware of the physical machine 100.

In the above described manner, the VMM 132 provides virtualized I/O access of shared hardware resources. For certain virtual machines (such as those associated with users who have paid extra for a direct I/O capability), however, the VMM 132 allows direct I/O control of some hardware resources. In the example of FIG. 1, a network interface 128B is an example of a hardware resource that is directly controlled by a virtual machine. As noted above, a first subset of virtual machine(s) has direct I/O control of hardware resources, while a second subset of virtual machine(s) is provided virtualized I/O access of hardware resources. In one specific example, it is assumed that the virtual machine 106 has direct I/O control of the network interface 128B, while the virtual machine 108 is granted virtualized I/O access of the remaining hardware resources 122.

Note that each virtual machine has a corresponding operating system and associated device driver(s) such that the management of I/O access by a virtual machine of a corresponding hardware resource (either virtualized or direct) is handled by the corresponding operating system and associated device driver(s). Thus, for example, the operating system 118 and device driver(s) 120 of the virtual machine 106 has direct I/O control of the network interface 128B, such that the virtual machine 106 can communicate over the network 104 through the network interface 128B using direct I/O access. On the other hand, since the operating system and associated device driver(s) of the virtual machine 108 is provided virtualized I/O access of the hardware resources 122 including the network interface 128A, then any communication with the network interface 128A is through a virtualization provided by the VMM 132. Note that there may be additional virtual machines in the physical machine 100 that share the network interface 128A such that the VMM 132 can provide multiple virtualizations of the network interface 128A to allow for multiple virtual machines that share the network interface 128A access to the network interface 128A.

A direct I/O virtual machine is able to bypass the VMM 132 and go directly to the hardware resource. In other words, the operating system and device driver(s) of the direct I/O virtual machine are able to directly access the I/O port(s) and memory mapped I/O address space of the hardware resource. On the other hand, virtual machines that use virtualized I/O have to perform I/O accesses through the interface provided by the VMM 132.

In some implementations, it is possible that at least one of the virtual machines is provided the ability to both perform direct I/O control of a hardware resource, as well as a virtualized I/O access of another hardware resource.

As noted above, hot-plug events are used as part of the migration procedure for a direct I/O virtual machine. Various bus standards support hot plugging of hardware resources, such as Peripheral Component Interconnect (PCI) bus standards, which include PCI, PCI-X, and PCI Express (PCIe). Other bus standards can also support hot plugging.

When a hot plug (either hot add or hot remove) occurs, the operating system of the system is typically notified of the hot plug. The notification is in the form of a hot-plug event notification. In one example implementation, the hot-plug event notification can be an interrupt according to the Advanced Configuration and Power Interface Specification, although other types of hot-plug event notification can be used in other example implementations. Based on information in the hot-plug event notification, or based on information retrieved as a result of the hot-plug event notification, the operating system can properly handle the added or removed hardware resource.

In the context of virtual machine migration, and in particular, in the context of migrating virtual machines from one physical machine to another physical machine, it is noted that it is the virtual machine that is being removed from the physical machine for loading into another physical machine, and not the hardware resource. In other words, when migrating a virtual machine from one physical machine to another physical machine, the hardware resources of the source and destination physical machines remain plugged into each corresponding physical machine, while the virtual machine changes platform.

However, in accordance with some embodiments, from the perspective of the virtual machine that is being migrated, the change in hardware resources as a result of the virtual machine migrating from one physical machine to another physical machine can be treated as a hot-plug event; in other words, from the perspective of the migrated virtual machine, the hardware resource in the source physical machine is being hot removed, while the hardware resource of the destination physical machine is being hot added. If the hot-removed hardware resource of the source physical machine and the hot-added hardware resource of the destination physical machine are of identical type, then the change in hardware resources can be handled by performing a hot replace event (instead of discrete hot remove and hot add events). However, it is contemplated that the direct I/O-controlled hardware resources of the source physical machine and the destination physical machine may be of different types, such that discrete hot remove and hot add operations have to be performed. Hardware resources of "different types" refer to hardware resources that differ in any respect. For example, the source physical machine may use a first type of network interface, while the destination physical machine may use a different type of network interface. Alternatively, the source and destination physical machines can both use the same type of network interface.

Since hardware resources are not actually hot-removed or hot-added to the source and destination physical machines, the hot-remove and hot-add events are generated by the corresponding VMMs (VMM 132 in the source physical machine 100 and VMM 134 in the destination physical machine 102 in the example of FIG. 1).

In the source physical machine 100, the VMM 132 includes hot-plug control logic 160 to provide a hot-plug event notification to the operating system of the virtual machine that is being migrated (which is 106 in the example). The hot-plug event notification generated at the source physical machine is a hot-remove event notification.

The VMM 134 in the destination physical machine 102 similarly includes a hot-plug control logic 162 for generating a hot-plug event notification to the operating system of the virtual machine (e.g., 106) that has been migrated to the destination physical machine 102. The hot-plug event notification generated by the hot-plug control logic 162 is a hot-add event notification. However, as noted above, instead of discrete hot-remove and hot-add events, a hot-replace event can be used instead if the direct I/O-controlled hardware resources of the source and destination physical machines are of identical types.

Hardware resources 130 of the physical machine 102 can be similar to the hardware resources 122 in the physical machine 100. In the example of FIG. 1, the hardware resources 130 of the physical machine 102 include a first network interface 164A and a second network interface 164B, along with other hardware resources (not shown). The first network interface 164A can be a network interface that is shared by multiple virtual machines in the physical machine 102 based on virtualization performed by the VMM 134. The second network interface 164B can be a direct I/O-controlled network interface controlled by a direct I/O virtual machine (e.g., 106 after migration).

As further shown in FIG. 1, a placement controller 136 (or multiple placement controllers) is (are) provided on the network 104 to provide automated management of placement of virtual machines in corresponding physical machines. In the ensuing discussion, reference is made to just one placement controller 136; however, note that the tasks of the one placement controller 136 can be performed by multiple placement controllers.

The placement controller 136 has a VM layout selector 144 to perform selection of a layout of the virtual machines mapped to physical machines. The placement controller 136 also includes migration control logic 168 to control migration of virtual machines according to the layout selected by the VM layout selector 144.

In selecting placement of virtual machines across physical machines, the VM layout selector 144 takes into account various predefined criteria. One type of predefined criteria is related to the loading of physical resources (including hardware) or machines. Since there are various different physical resources (e.g., CPU, memory, network interface, storage network, etc.), there are different loading criteria to consider. The different loading criteria thus include a loading criterion relating to the CPU usage, a loading criterion relating to memory usage, a loading criterion relating to network interface usage, a loading criterion relating to storage network usage, and any other loading criteria relating to usage of other resources.

Also, another loading criterion is an overloading criterion, which specifies that any particular physical machine should not be loaded by greater than some predefined threshold (e.g., 80%). If loading of a physical machine exceeds this predefined threshold, then migration of virtual machine(s) from the overloaded physical machine would be desirable.

Placement of virtual machines should satisfy a QoS (quality of service) goal of the system. This QoS may have been set by a user or by the system. One example QoS goal is the allocation of scheduling shares to each virtual machine within a physical machine. The VMM 132 or 134 according to some implementations includes a scheduler that schedules access to physical resources of the physical machine 100 or 102, where the scheduler in the VMM 132 or 134 specifies the number of shares to allocate to each virtual machine. For example, 2,000 shares may be allocated to a first virtual machine, 1,000 shares may be allocated to a second virtual machine, and 500 shares may be allocated to a third virtual machine. In this example scenario, the first virtual machine has half the number of shares of the physical machine. The half share of the physical resources of the physical machine can be considered a QoS goal of the first virtual machine. Thus, if the placement controller 136 decides to migrate the first virtual machine 106 from one physical machine to another physical machine, the placement controller 136 checks to ensure that after migration the QoS for the first virtual machine can be kept at the same ratio.

Other example criteria that are considered by the VM layout selector 144 include cooling and power criteria. During operation, temperatures in physical machines can exceed a temperature threshold. If this occurs, then migration of virtual machines from the over-heated physical machines may be desirable. Cooling criteria can also specify cooling costs. In large data centers, for example, sophisticated cooling equipment is usually provided to cool physical machines. To reduce cooling costs, migration of virtual machines can be performed in a manner that allows some part of the cooling equipment to be turned off (or run in a lower power mode). In one example, virtual machines can be placed such that one or more physical machines can be turned off (or placed in a lower power state), such that corresponding cooling equipment can be shut off (or run in a lower power mode). The lower power state of a physical machine refers to any one of several possible power savings states of such machines, including sleep states, standby states, hibernation states, and so forth.

Power criteria are also considered by the VM layout selector 144. In addition to turning off (or placing into a lower power state) physical machines for the purpose of reducing cooling costs, such action can also be performed for the purpose of reducing power consumption of physical machines (for more efficient usage).

Both the cooling criteria and power criteria are considered consolidation criteria that favor migrating virtual machines onto fewer physical machines so that at least some of the physical machines can be turned off or otherwise placed into an idle state, for cost and power conservation. However, the cooling and power criteria are counter-balanced by some of the other factors, such as loading criteria that tend to favor distributing or spreading virtual machines across a larger number of physical machines.

Another criterion that may be considered by the VM layout selector 144 is the cost of performing migration of a virtual machine. Migrating a virtual machine from one physical machine to another physical machine is associated with a cost (in terms of the virtual machine being unavailable during migration and the bandwidth cost associated with moving data associated with the migrated virtual machine from one storage location to another storage location). If the VM layout selector 144 determines that the benefit of migrating a virtual machine is less than the cost of performing the migration, then the migration should not be performed.

Another criterion that is considered by the VM layout selector 144 in making a layout selection decision is the availability of a direct I/O hardware resource in the destination physical machine. For example, a virtual machine that has direct I/O control of a hardware resource in a source physical machine should be migrated to a destination machine that also provides I/O control of a corresponding hardware resource. However, if it is determined that virtualized I/O control can provide sufficient performance, then the virtual machine can be migrated to a physical machine that uses virtualized I/O control.

The placement controller 136 includes one or more CPUs 138 and memory 140. Also, a network interface 142 is provided in the placement controller 136 to allow communication between the placement controller 136 and the network 104.

The VM layout selector 144 can cooperate with the migration control logic 168 to control migration of virtual machines according to the layout selected by the VM layout selector 144. Alternatively, the VM layout selector 144 can cooperate with respective migration engines (152 and 153 depicted in FIG. 1) to control the migration of virtual machines across physical machines. In the example depicted in FIG. 1, the migration engines 152 and 153 that are deployed in corresponding physical machines 100, 102 can be provided as part of respective administrative virtual machines 150, 170. An administrative virtual machine is used to perform administrative tasks associated with the corresponding physical machine. Alternatively, the migration engine 152 or 153 can be separate from an administrative virtual machine.

Figure 2:
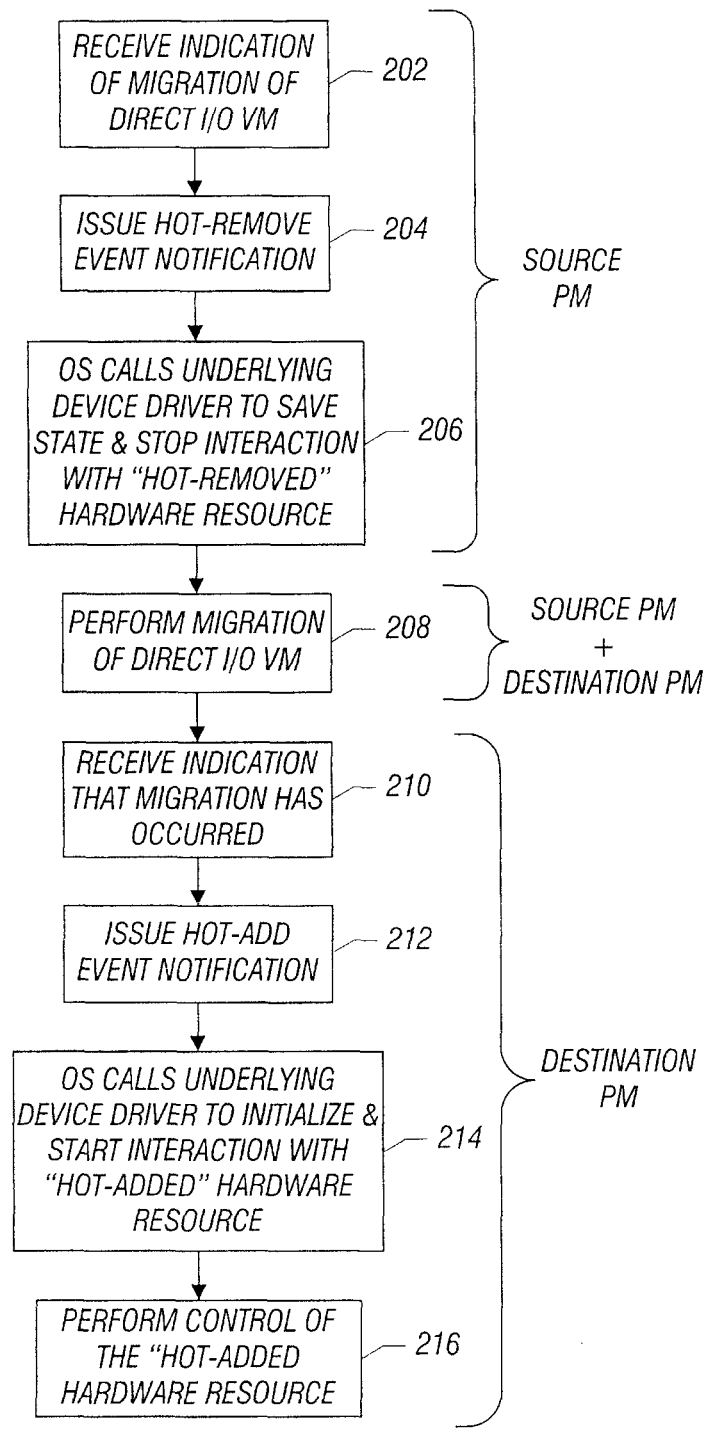
FIG. 2 is a flow diagram of a process of migrating a virtual machine from a first physical machine to a second physical machine that involves use of hot-plug events, according to an embodiment.

FIG. 2 illustrates an example procedure of performing live migration of a direct I/O virtual machine in accordance with an embodiment. In the example, it is assumed that the migration is to be performed from source physical machine 100 to destination physical machine 102, and that the virtual machine being migrated is virtual machine 106 which has direct I/O control of network interface 128B. Once migrated to the physical machine 102, the virtual machine 106 will have direct I/O control of network interface 164B in the destination physical machine 102.

The VMM 132 in the source physical machine 100 receives (at 202) an indication of migration of the direct I/O virtual machine 106. The indication can be received from the placement controller 136, or alternatively, can be received from the administrative virtual machine 150 in response to some indication received from the placement controller 136 by the administrative virtual machine 150.

In response to the indication of migration of a direct I/O virtual machine, the hot-plug control logic 160 in the VMM 132 issues (at 204) a hot-remove event notification to the operating system 118 of the virtual machine 106. The hot-remove event notification that is received by the operating system 118 of the virtual machine 106 can contain various information, including address information, slot information (identifier of the slot in which the network interface 128B is provided), and other information.

In response to the hot-remove event notification, the operating system 118 calls (at 206) the underlying device driver 120 associated with the direct I/O hardware resource (in this case the network interface 128B) to save the state associated with the network interface 128B and to stop interaction between the network interface device driver and the network interface 128B.

Next, migration of the direct I/O virtual machine from the source physical machine 100 to the destination physical machine 102 according to the layout selected by the VM layout selector 144 is performed (at 208). Control of the migration can be performed by either the migration control logic 168 of the placement controller 136, or by the migration engines 152, 153 of the physical machines 100, 102. Migrating a virtual machine refers to moving the state of the virtual machine from one physical machine to another physical machine. The state of the virtual machine includes content of registers of various hardware devices (e.g., CPUs, I/O devices, and so forth). In accordance with some embodiments, a further state of the virtual machine that is migrated includes the state of the direct I/O device driver. Moreover, data in memory associated with the migrated virtual machine can also be transferred to the destination physical machine to which the virtual machine is migrated.

Once the migration of the direct I/O virtual machine 106 has been performed, the VMM 134 in the destination physical machine 102 receives (at 210) an indication that migration of the virtual machine has occurred. In response, the hot-plug control logic 162 of the VMM 134 issues (at 212) a hot-add event to the operating system 118 of the virtual machine 106 that has been migrated. The hot-add event notification includes various information associated with the direct I/O network interface 164B of the destination physical machine 102. In response to the hot-add event notification, the operating system 118 of the virtual machine 106 that has been migrated calls (at 214) the underlying network interface device driver to initialize the state of the device driver and to start interaction with the "hot-added" hardware resource (which in this case is the network interface 164B). At this point, the virtual machine 106 can perform (at 216) direct I/O control of the "hot-added" hardware resource.

The tasks of FIG. 2 may be provided in the context of information technology (IT) services offered by one organization to another organization. For example, the infrastructure (including the placement controllers, physical machines, and virtual machines of FIG. 1) may be owned by a first organization. The IT services may be offered as part of an IT services contract, for example.

Instructions of software described above (including hot-plug control logic 160, 162, VMMs 132, 134, migration engines 152, 153, VM layout selector 144, and migration control logic 168 of FIG. 1) are loaded for execution on a processor (such as one or more CPUs 124, 138 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of migrating a virtual machine from a first physical machine to a second physical machine, comprising:
   in response to an indication that the virtual machine is to be migrated, issuing, in the first physical machine, a hot-remove event notification to an operating system of the virtual machine, wherein the hot-remove event notification is a notification generated by a virtual machine monitor that a hardware resource of the first physical machine is being hot removed; and
   after issuing the hot-remove event notification, performing, by the first physical machine, migration of the virtual machine to the second physical machine.

2. The method of claim 1, further comprising:
   after migration of the virtual machine from the first physical machine to the second physical machine, issuing, in the second physical machine, a second hot-plug event notification to the operating system of the virtual machine that has been migrated to the second physical machine.

3. The method of claim 2, wherein issuing the second hot-plug event notification in the second physical machine comprises issuing a hot-add event notification.

4. The method of claim 3, wherein the hot-add event notification relates to a hardware resource in the second physical machine, the method further comprising:
   the operating system of the virtual machine that has been migrated to the second physical machine calling an underlying device driver associated with the hardware resource in the second physical machine to cause the device driver to begin interaction with the hardware resource in the second physical machine.

5. The method of claim 1, further comprising the operating system calling an underlying device driver associated with the hardware resource related to the hot-remove event notification, wherein the operating system call causes the device driver to stop interaction with the hardware resource.

6. The method of claim 5, wherein the operating system call causes the device driver to save its state.

7. The method of claim 5, wherein migration of the virtual machine from the first physical machine to the second physical machine is performed after the operating system has called the device driver in response to the hot-remove event notification.

8. The method of claim 1, wherein the hot-remove event notification is issued in response to the indication that the virtual machine is to be migrated even though the hardware resource has not been hot-removed from the first physical machine.

9. The method of claim 8, further comprising:
   the virtual machine performing direct input/output (I/O) control of the hardware resource in the first physical machine prior to migration.

10. The method of claim 1, further comprising:
    the virtual machine performing a direct input/output (I/O) control of the hardware resource in the first physical machine; and
    a second virtual machine in the first physical machine performing virtualized I/O access of another hardware resource in the first physical machine.

11. A method of migrating a virtual machine from a first physical machine to a second physical machine, comprising:
    in response to an indication that the virtual machine is to be migrated, issuing, by a virtual machine monitor in the first physical machine, a hot-remove event notification to an operating system of the virtual machine, the hot-remove event notification being a notification generated by the virtual machine monitor that a hardware resource of the first physical machine is being hot removed;
    after issuing the hot-remove event notification, performing, by the first physical machine, migration of the virtual machine to the second physical machine; and
    a migration engine in the first physical machine controlling the migration of the virtual machine to the second physical machine according to a layout selected by a placement controller that is separate from the first and second physical machines.

12. An article comprising at least one non-transitory computer-readable storage medium containing instructions that when executed cause a first physical machine to:
    provide a first virtual machine that has an operating system, wherein the operating system of the first virtual machine performs direct input/output (I/O) control of a first hardware resource of the first physical machine;
    in response to an indication that the first virtual machine is to be migrated from the first physical machine to a second physical machine, cause a virtual machine monitor to issue a hot-remove event notification to the operating system of the first virtual machine, the hot-remove event notification being a notification generated by the virtual machine monitor that the first hardware resource of the first physical machine is being hot removed even though the first hardware resource has not been hot removed from the first physical machine; and after issuing the hot-remove event notification, perform migration of the first virtual machine from the first physical machine to the second physical machine.

13. The article of claim 12, wherein the instructions when executed cause the first physical machine to further:

provide a second virtual machine that has an operating system that performs virtualized I/O access of another hardware resource in the first physical machine.

14. A first physical machine comprising:

a hardware resource;

a virtual machine having an operating system to perform direct input/output (I/O) control of the hardware resource;

a virtual machine monitor having a hot-plug control logic to receive an indication that the virtual machine is to be migrated from the first physical machine to a second physical machine, wherein the hot-plug control logic in the virtual machine monitor is configured to issue a hot-remove event notification to the operating system of the virtual machine in response to the received indication, the hot-remove event notification being a notification generated by the virtual machine monitor that the hardware resource of the first physical machine is being hot removed; and a migration engine to control migration of the virtual machine from the first physical machine to the second physical machine after the issuing of the hot-remove event notification.

15. The first physical machine of claim 14, wherein the hot-remove event notification indicates that the hardware resource is being hot removed from the first physical machine even though the hardware resource is actually not being hot removed from the first physical machine.

* * * * *